(12) United States Patent
Wang et al.

(10) Patent No.: US 11,879,514 B2
(45) Date of Patent: Jan. 23, 2024

(54) COMPOSITE IMPACT RESISTANCE APPARATUS AND APPLICATIONS THEREOF

(71) Applicant: Shandong University of Science and Technology, Qingdao (CN)

(72) Inventors: Chenglong Wang, Qingdao (CN); Meng Chen, Qingdao (CN)

(73) Assignee: Shandong University of Science and Technology, Qingdao (CN)

( * ) Notice: Subject to any disclaimer, the term of this patent is extended or adjusted under 35 U.S.C. 154(b) by 0 days.

(21) Appl. No.: 18/043,733

(22) PCT Filed: Jun. 15, 2021

(86) PCT No.: PCT/CN2021/100157
§ 371 (c)(1),
(2) Date: Mar. 2, 2023

(87) PCT Pub. No.: WO2022/179006
PCT Pub. Date: Sep. 1, 2022

(65) Prior Publication Data
US 2023/0313859 A1    Oct. 5, 2023

(30) Foreign Application Priority Data
Feb. 23, 2021  (CN) .......................... 202110201245.0

(51) Int. Cl.
*F16F 13/00*    (2006.01)
*F16F 9/34*     (2006.01)
(Continued)

(52) U.S. Cl.
CPC .............. *F16F 13/007* (2013.01); *F16F 7/12* (2013.01); *F16F 9/3242* (2013.01);
(Continued)

(58) Field of Classification Search
CPC .......... F16F 13/007; F16F 7/12; F16F 9/3242; F16F 9/3292; F16F 9/34; F16F 9/368;
(Continued)

(56) References Cited

U.S. PATENT DOCUMENTS 4,821,983 A * 4/1989 Aubry ..................... F16F 9/348
                                                267/64.23
6,385,918 B1 * 5/2002 Robinson .................. F16F 9/30
                                                 384/36
(Continued)

FOREIGN PATENT DOCUMENTS

JP        2010156448 A      7/2010

*Primary Examiner* — Robert A. Siconolfi
*Assistant Examiner* — James K Hsiao
(74) *Attorney, Agent, or Firm* — PROI Intellectual Property US; Klaus Michael Schmid

(57) ABSTRACT

Disclosed are a compound impact-resistant device and an application thereof. The compound impact-resistant device includes an inner cylinder, a first pressure sensor and an outer cylinder; an inner cavity of the inner cylinder is connected to a magnetorheological damper, a spiral valve element, a floating piston and a spring from bottom to top; and the outer cylinder is connected to a piston rod, a bottom end of the piston rod penetrates a top of the inner cylinder, the spring and the floating piston to be connected to the spiral valve element, and a portion below the spiral valve element is filled with hydraulic oil. The compound impact-resistant device can provide specific initial support force and achieve active self-adaptation to dynamic impact, thus solving the problems that traditional hydraulic buffers cannot provide initial support force and traditional mechanical crushing members have difficulty in providing large support force.

8 Claims, 5 Drawing Sheets

(51) Int. Cl.
*F16F 9/36* (2006.01)
*F16F 9/53* (2006.01)
*F16F 7/12* (2006.01)
*F16F 9/32* (2006.01)

(52) U.S. Cl.
CPC .............. *F16F 9/3292* (2013.01); *F16F 9/34* (2013.01); *F16F 9/368* (2013.01); *F16F 9/535* (2013.01); *F16F 2222/12* (2013.01); *F16F 2224/02* (2013.01); *F16F 2226/04* (2013.01); *F16F 2226/048* (2013.01); *F16F 2228/066* (2013.01); *F16F 2230/08* (2013.01); *F16F 2230/18* (2013.01); *F16F 2230/30* (2013.01); *F16F 2230/42* (2013.01); *F16F 2232/08* (2013.01); *F16F 2236/045* (2013.01)

(58) Field of Classification Search
CPC .... F16F 9/535; F16F 2222/12; F16F 2224/02; F16F 2226/04; F16F 2226/048; F16F 2228/066; F16F 2230/08; F16F 2230/18; F16F 2230/30; F16F 2230/42; F16F 2232/08; F16F 2236/045
See application file for complete search history.

(56) References Cited

U.S. PATENT DOCUMENTS

| | | | |
|---|---|---|---|
| 6,427,986 B1* | 8/2002 | Sakai | B60G 17/0416 188/282.4 |
| 6,616,124 B2* | 9/2003 | Oliver | F16K 3/265 251/321 |
| 7,856,766 B2* | 12/2010 | Takenoshita | F16F 7/08 52/167.7 |
| 8,418,999 B2* | 4/2013 | Kawada | F16F 1/406 267/141.1 |
| 8,517,154 B2* | 8/2013 | Maeda | F16F 9/3488 188/313 |
| 9,884,533 B2* | 2/2018 | Blankenship | F16F 9/463 |
| 10,072,723 B2* | 9/2018 | Hart | F16F 9/363 |
| 10,563,720 B2* | 2/2020 | Hart | F16F 9/363 |
| 11,274,723 B2* | 3/2022 | Wieners | F16F 9/363 |
| 11,584,187 B2* | 2/2023 | Newstead | B60G 17/08 |
| 11,745,558 B2* | 9/2023 | Anderson | B60G 99/002 701/37 |
| 2009/0272611 A1* | 11/2009 | Hayama | F16F 9/3485 188/282.1 |
| 2010/0044173 A1* | 2/2010 | Niculescu | F16F 9/346 188/313 |
| 2010/0096229 A1* | 4/2010 | Azekatsu | F16F 9/5126 188/282.1 |
| 2011/0079475 A1* | 4/2011 | Roessle | F16F 9/18 188/266.5 |
| 2011/0209956 A1* | 9/2011 | Maeda | F16F 9/369 188/322.13 |
| 2011/0290603 A1* | 12/2011 | Yabe | F16F 9/46 188/282.1 |
| 2012/0247889 A1* | 10/2012 | Yabe | F16F 9/465 188/269 |
| 2014/0239602 A1* | 8/2014 | Blankenship | F16F 9/3207 280/5.515 |
| 2021/0123496 A1 | 4/2021 | Chen | |

* cited by examiner

COMPOSITE IMPACT RESISTANCE APPARATUS AND APPLICATIONS THEREOF

TECHNICAL FIELD

The present invention relates to a compound impact-resistant device and an application thereof, and belongs to the technical field of buffering apparatuses.

BACKGROUND ART

An impact-resistant device is a kind of energy-absorbing device mounted on mechanical apparatuses, and is extensively used in automobile industry, aerospace, mining machinery and other fields. It can reduce the impact force of apparatuses impacted, and improve their reliability and safety and prolong their service life.

For example, Chinese Patent Document CN111322345A discloses a novel impact-resistant device and a working method thereof. The device includes a first connector, an upper outer cylinder, a lower outer cylinder and a second connector which are connected in sequence. The top of the lower outer cylinder is sleeved with the upper outer cylinder to be movably connected to the upper outer cylinder; the lower cylinder is internally provided with an aluminum honeycomb and an outer magnetorheological damper cylinder, the aluminum honeycomb is arranged at the bottom of a lower end cover, the outer magnetorheological damper cylinder is internally provided with a piston rod, the top end of the piston rod extends out of the upper end cover and is connected to a bump head, and a reset spring sleeves a portion, between the bump head and the upper end cover, of the piston rod; and an electromagnetic coil is wound around the piston rod, a lower portion of the piston rod is a damping piston provided with a damping hole, the bottom end of the damping piston is provided with a guide disk, and a portion below the guide disk is filled with magnetorheological fluid. The present invention is mounted between two carriages of a mine car, and when the speed of a rear carriage is higher than that of a front carriage or a present carriage is braked, the rear carriage is buffered for avoiding impacting and achieves effective deceleration; and when an accident occurs, a back carriage is buffered, thereby effectively preventing secondary injury of the accident.

Chinese Patent Document CN208669329U discloses a rockburst-resistant buffer system for a hydraulic support and the hydraulic support. The system includes an upright. The upright includes a movable post, a middle oil cylinder, a bottom oil cylinder and an impact-resistant buffer which are connected in sequence, the impact-resistant buffer is provided with a pressure sensor and a controller which are connected to each other, and the controller is also electrically connected to a magnetorheological coil in the impact-resistant buffer; and the pressure sensor collects pressure information, and the controller adjusts and switches on/off currents of the magnetorheological coil in real time, such that the impact-resistant buffer can help buffer rockburst of the upright. The novel rockburst-resistant buffer system of the utility model can be conveniently integrated into an existing hydraulic support structure, and is convenient to mount and use in a manner of fitting an existing hydraulic support. A traditional single way of pressure relief relying on large-flow safety valves is changed, and the buffer system can effectively protect the buffer and pressure relief process of the upright, and also improve reliability of the hydraulic support against rockburst, and guarantee safe and effective work of the hydraulic support.

Under the impact working condition, the hydraulic support should not only have sufficient support force, but be able to effectively buffer impact loads. Existing impact-resistant devices are mostly hydraulic buffers or mechanical crushing members. The hydraulic buffers of mandrel type, porous type, gap type, etc. are provided and the mechanical crushing members include aluminum honeycombs, bellows, etc. The hydraulic buffer can absorb impact energy stably, but cannot effectively provide initial support force. Traditional aluminum honeycombs or bellows crushing members are prone to deform and high in energy absorption capacity, but cannot provide large support force within a limited structural size due to their material properties. They has fixed support force after structural design is completed, which is impossible to adjust adaptively according to the actual working conditions.

Therefore, the present application proposes an intelligent compound impact-resistant device for a hydraulic support. The impact-resistant device can not only provide specific initial support force, but achieve active self-adaptation to dynamic impact, thus solving the problems that traditional hydraulic buffers may not provide initial support force, and traditional mechanical crushing members have difficulty in providing large support force, and may not be adjusted adaptively according to impact conditions.

SUMMARY

In order to solve the shortcomings of the prior art, the present invention provides a compound impact-resistant device, which may not only provide specific initial support force, but carry out self-adaptive adjustment according to impact working conditions.

The present invention further provides a working method of the compound impact-resistant device.

A Technical Solution of the Present Invention is as Follows a compound impact-resistant device includes an inner cylinder, a first pressure sensor and an outer cylinder, where the inner cylinder is connected to an inner bottom surface of the outer cylinder, and the first pressure sensor is placed in the outer cylinder and connected to a bottom of the inner cylinder;

an inner cavity of the inner cylinder is sequentially connected to a magnetorheological damper, a spiral valve element, a floating piston and a spring from bottom to top; and an inner top surface of the outer cylinder is connected to a piston rod, a bottom end of the piston rod penetrates a top of the inner cylinder, the spring and the floating piston to be connected to the spiral valve element, and a portion below the spiral valve element is filled with hydraulic oil.

Preferably, the outer cylinder includes a top cover, a crushing member and a base which are connected in sequence from top to bottom, and an upper end and a lower end of the crushing member are inserted into recesses provided in the top cover and the base respectively.

Preferably, an inner surface of the top cover is provided with a top cover welded member, and an upper end and a lower end of the piston rod are in threaded connection to the top cover welded member and the spiral valve element respectively.

Preferably, the inner cylinder includes an end cover, a cylinder body and a cylinder base which are sequentially connected from top to bottom, the end cover being connected to the cylinder body by means of a bolt, the cylinder body being welded on the cylinder base, and the cylinder base being placed on the base of the outer cylinder.

Preferably, a surface of the spiral valve element is provided with a plurality of circles of spiral recesses.

Preferably, silicone seals are arranged between the floating piston and an inner wall of the cylinder body, between the piston rod and the end cover, and between the piston rod and the floating piston.

Preferably, the magnetorheological damper includes a magnetorheological damper piston rod, a magnetorheological damper piston, a magnetorheological damper coil and a magnetorheological damper cylinder, where the magnetorheological damper piston is placed in the magnetorheological damper cylinder, the magnetorheological damper coil encircles the magnetorheological damper piston, and the magnetorheological damper piston rod extends into the magnetorheological damper cylinder to be connected to the magnetorheological damper piston.

Preferably, a lower half of the cylinder body is provided with a sensor interface, and the first pressure sensor is in threaded connection to the sensor interface.

Preferably, the compound impact-resistant device further includes a control system, an outer surface of the top cover is provided with a second pressure sensor, and the first pressure sensor, the second pressure sensor and the magnetorheological damper coil are connected to the control system respectively.

Preferably, the crushing member is in a hollowed structure.

A working method of the compound impact-resistant device includes:

1) mounting the impact-resistant device at a position needs to bear impact buffering, and connecting a first pressure sensor, a second pressure sensor and a magnetorheological damper coil to a control system, where in this case, a magnetorheological damper outputs a maximum resistance, and the whole impact-resistant device is in a maximum buffer resistance output state;
2) collecting, when the impact-resistant device receives external impact pressure, pressure information and transmitting the pressure information to the control system by the second pressure sensor, and adjusting, by the control system, a current of the magnetorheological damper coil to cause an output resistance of the magnetorheological damper to be zero; where in this case, only a crushing member bears external impact pressure, and the crushing member is crushed and deformed; and
3) driving, when the crushing member deforms and descends, a top cover, a piston rod and a spiral valve element to move downwards synchronously, where hydraulic oil below the spiral valve element is pressed to flow through a spiral recess, thereby consuming impact energy.

The Present Invention has the Technical Features and Beneficial Effects

1. The compound impact-resistant device of the present invention may not only provide specific initial support force, but achieve active self-adaptation to dynamic impact, thus solving the problems that traditional hydraulic buffers may not provide initial support force, and traditional mechanical crushing members have difficulty in providing large support force, and may not be adjusted adaptively according to impact conditions.

2. In the compound impact-resistant device of the present invention, the crushing member, the magnetorheological damper and the hydraulic buffer portion work together in the whole impact process, and the crushing member mainly plays the role of supporting, recessing and energy absorbing, the magnetorheological damper mainly controls the output resistance to achieve that the impact-resistant device may quickly recess and absorb energy when impact occurs, the hydraulic buffer portion plays the role of peak value reduction and energy absorbing, and the pressure sensor may monitor and record pressure change in real time, and determine whether the impact process occurs and whether the apparatus needs to be replaced.

Figure 1:
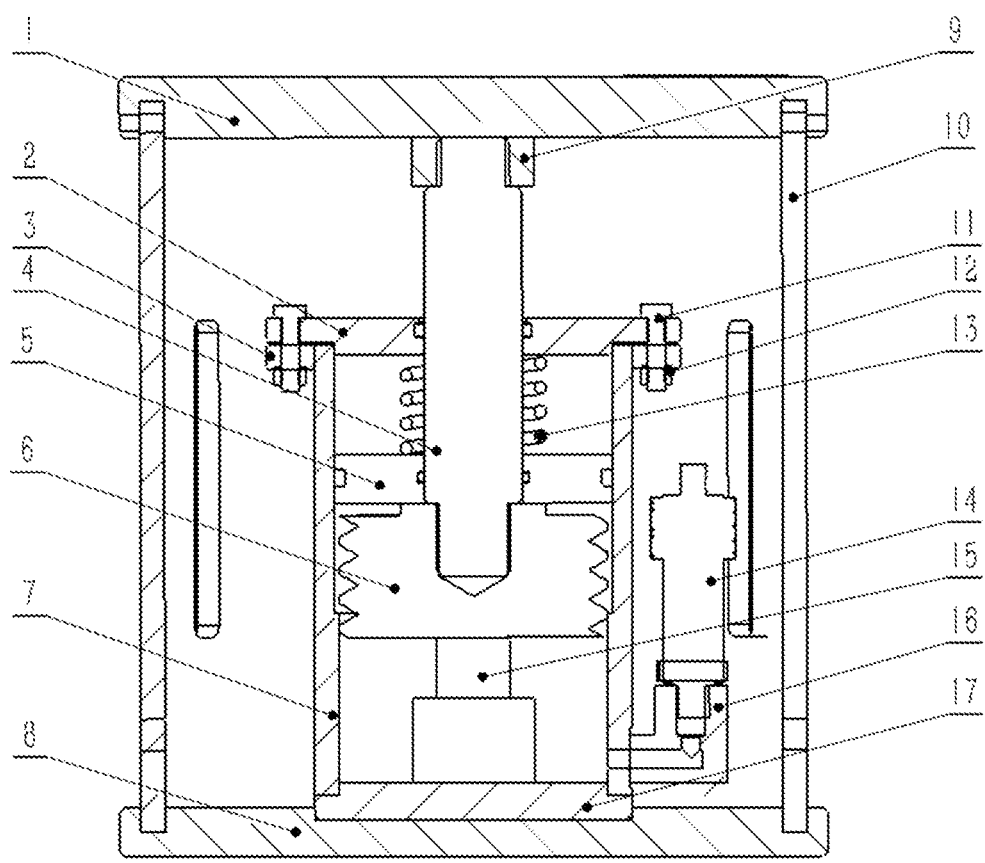
FIG. 1 is a schematic diagram of a sectional view of an impact-resistant device of the present invention.
Figure 2:
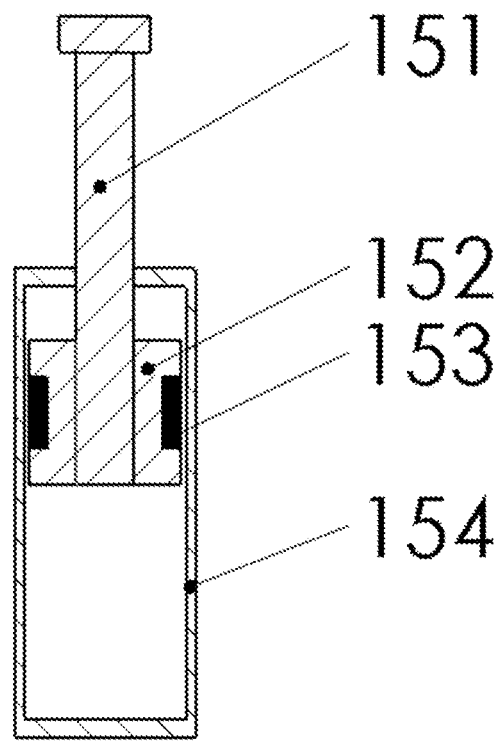
FIG. 2 is a schematic structural diagram of a magnetorheological damper according to the present invention.

In the figures: 1. top cover, 2. end cover, 3. cylinder boss, 4. piston rod, 5. floating piston, 6. spiral valve element, 7. cylinder body, 8. base, 9. top cover welded member, 10. crushing member, 11. bolt, 12. nut, 13. spring, 14. first pressure sensor, 15. magnetorheological damper, 16. sensor interface, 17. cylinder base, 151. magnetorheological damper piston rod, 152. magnetorheological damper piston, 153. magnetorheological damper coil, and 154. magnetorheological damper cylinder.

DETAILED DESCRIPTION OF THE EMBODIMENTS

The present invention will be further described below in conjunction with embodiments and with reference to accompanying drawings, and is not limited thereto though.

Embodiment 1

As shown in FIGS. 1-5, this embodiment provides a compound impact-resistant device. The compound impact-resistant device includes an inner cylinder, a first pressure sensor and an outer cylinder, where the inner cylinder is connected to an inner bottom surface of the outer cylinder, and the first pressure sensor is placed in the outer cylinder and connected to a bottom of the inner cylinder;

an inner cavity of the inner cylinder is sequentially connected to a magnetorheological damper 15, a spiral valve element 6, a floating piston 5 and a spring 13 from bottom to top; and an inner top surface of the outer cylinder is connected to a piston rod 4, a bottom end of the piston rod 4 penetrates a top of the inner cylinder, the spring 13 and the floating piston 5 to be connected to the spiral valve element 6, and a portion below the spiral valve element 6 is filled with hydraulic oil.

Specifically, the outer cylinder includes a top cover 1, a crushing member 10 and a base 8 which are connected in sequence from top to bottom, and an upper end and a lower end of the crushing member 10 are inserted into recesses provided in the top cover 1 and the base 8 respectively.

An inner surface of the top cover 1 is provided with a top cover welded member 9, and an upper end and a lower end of the piston rod 4 are in threaded connection to the top cover welded member 9 and the spiral valve element 6 respectively.

The inner cylinder includes an end cover 2, a cylinder body 7 and a cylinder base 17 which are sequentially connected from top to bottom, the end cover 2 being connected to the cylinder body 7 by means of a bolt, the cylinder body 7 being welded on the cylinder base 17, and the cylinder base 17 being placed on the base 8 of the outer cylinder.

A surface of the spiral valve element 6 is provided with a plurality of circles of spiral recesses, and the spiral recesses may be used for hydraulic oil to flow through and play a buffering role.

Silicone seals are arranged between the floating piston 5 and an inner wall of the cylinder body 7, between the piston rod 4 and the end cover 2, and between the piston rod 4 and the floating piston 5.

The magnetorheological damper 15 includes a magnetorheological damper piston rod 151, a magnetorheological damper piston 152, a magnetorheological damper coil 153 and a magnetorheological damper cylinder 154, where the magnetorheological damper piston 152 is placed in the magnetorheological damper cylinder 154, the magnetorheological damper coil 153 encircles the magnetorheological damper piston 152, and the magnetorheological damper piston rod 151 extends into the magnetorheological damper cylinder 154 to be connected to the magnetorheological damper piston 152.

A lower half of the cylinder body 7 is provided with a sensor interface 16, and the first pressure sensor 14 is in threaded connection to the sensor interface 16.

The compound impact-resistant device further includes a control system, an outer surface of the top cover 1 is provided with a second pressure sensor (not shown in the figure), and the first pressure sensor 14, the second pressure sensor and the magnetorheological damper coil 153 are connected to the control system respectively.

Figure 3:
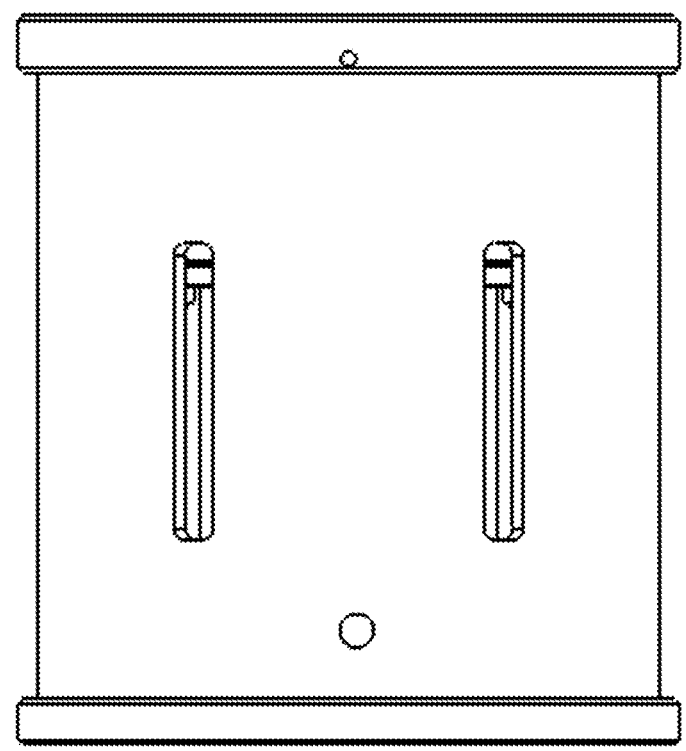
FIG. 3 is an overall external view of an impact-resistant device of the present invention.
Figure 4:
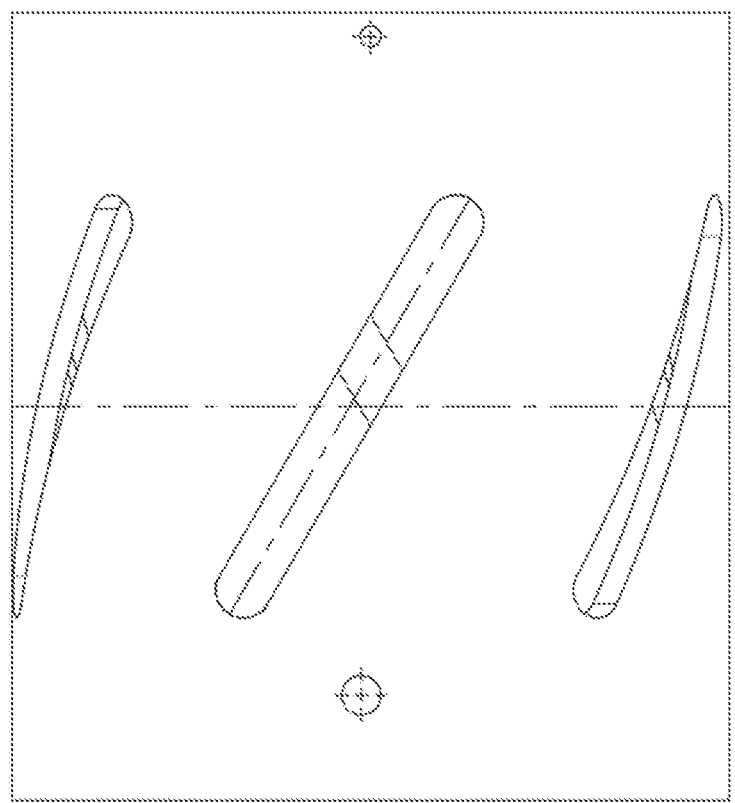
FIG. 4 is a schematic diagram of structural features of a crushing member of the present invention.
Figure 5:
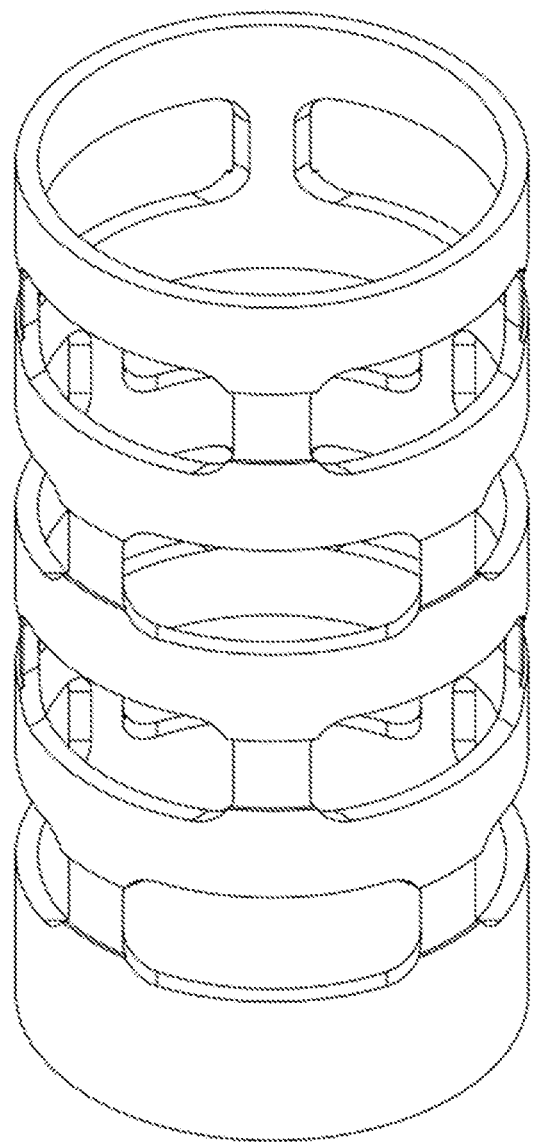
FIG. 5 is a schematic diagram of an overall structure of a crushing member of the present invention.

The crushing member 10 is in a hollowed structure, and is provided with vertical elongated openings as shown in FIG. 3, or inclined elongated openings as shown in FIG. 4, or multi-layered staggered transverse openings as shown in FIG. 5.

A working principle of a technical solution of this embodiment is as follows: when there is no impact, the initial support force of the impact-resistant device is F.

$$F=F_1+F_2 \qquad (1)$$

F=total resistance of the impact-resistant device
$F_1$=mechanical crushing resistance of the impact-resistant device
$F_2$=resistance of the magnetorheological damper As shown in formula (1), the crushing member 10 in the impact-resistant device may play a supporting role, and has support force reaching $F_1$ by reasonably designing structural parameters thereof. The magnetorheological damper 15 controls a shear yield strength of magnetorheological fluid by controlling a current of the magnetorheological damper coil 153, so as to control damping force output of the magnetorheological damper 15. The output resistance of the magnetorheological damper 15 in this embodiment ranges is $0$-$F_2$. In this way, the adjustable range of the resistance of the whole impact-resistant device may be $F_1$-$(F_1+F_2)$. When the support works normally, the total resistance of the impact-resistant device is controlled to be $F_1+F_2$, and in this case, the hydraulic buffer portion does not act, a pressure monitoring system reports that there is no impact without abnormality. When the hydraulic support suffer large impact, the pressure monitoring system quickly gives an alarm and controls the output resistance of the magnetorheological damper 15 to decrease, and the total resistance of the impact-resistant device quickly drops to $F_1$. Since the support force of the crushing member 10 is less than a structural strength of an upright, the crushing member 10 may be quickly crushed and deform when impacted, and drive the top cover 1, the piston rod 4 and the spiral valve element 6 to move downwards synchronously. Oil below the spiral valve element 6 may flow through the spiral recess at a high flow rate when pressed, and consumes impact energy. The crushing member 10, the magnetorheological damper 15 and the hydraulic buffer portion work together in the whole impact process, and the crushing member 10 mainly plays the role of supporting, recessing and energy absorbing, the magnetorheological damper 15 mainly controls the output resistance to achieve that the impact-resistant device may quickly recess and absorb energy when impact occurs, the hydraulic buffer portion plays the role of peak value reduction and energy absorbing, and the first pressure sensor 14 may monitor and record pressure change in real time, and determine whether the impact process occurs and whether the apparatus needs to be replaced.

Embodiment 2

Figure 6:
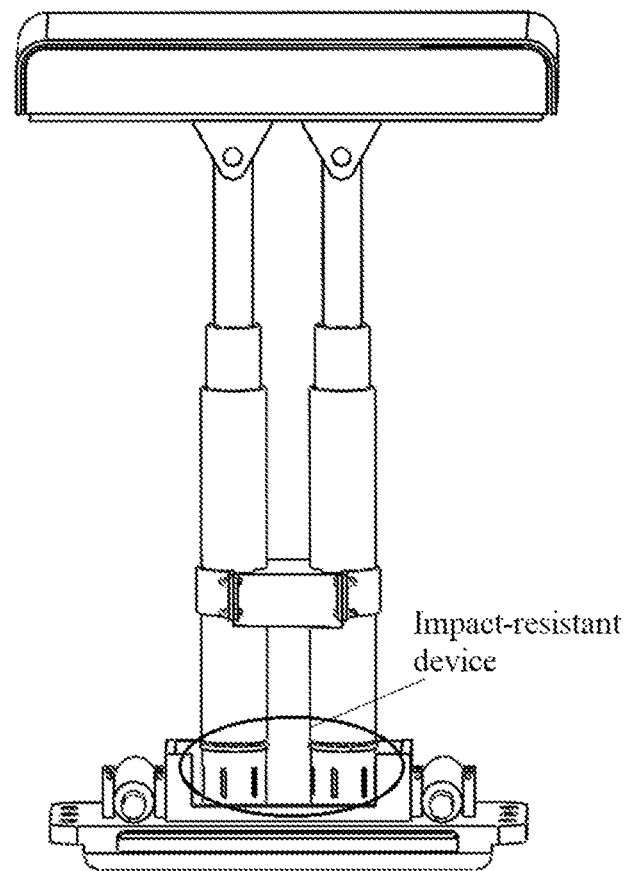
FIG. 6 is a schematic diagram of an impact-resistant device mounted on a hydraulic support of the present invention.
Figure 7:
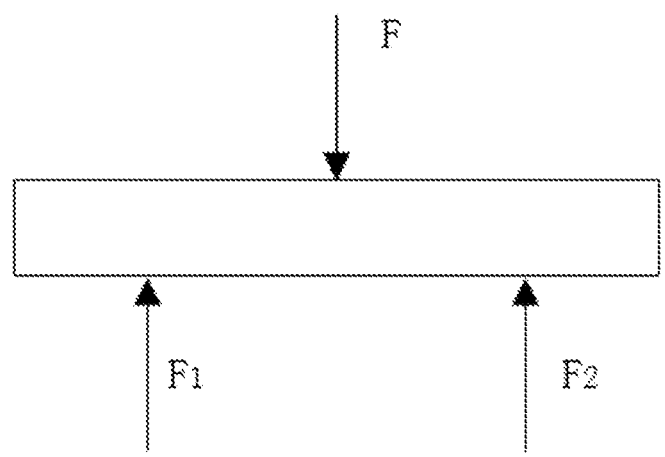
FIG. 7 is a schematic stress diagram of an impact-resistant device of the present invention.

A working method of the compound impact-resistant device described in Embodiment 1 takes a hydraulic support as an application object, and includes a specific working process as below:

1) As shown in FIG. 6, the impact-resistant device is mounted at a bottom end of an upright of the hydraulic support, two ends of the impact-resistant device are connected to the upright and a base of the hydraulic support respectively, a first pressure sensor 14, a second pressure sensor and a magnetorheological damper coil 153 are connected to a control system, where in this case, a magnetorheological damper 15 outputs a maximum resistance, and the whole impact-resistant device is in a maximum buffer resistance output state.

2) When impact is applied to the hydraulic support and transmitted to the impact-resistant device through the upright, the second pressure sensor collects pressure information and transmits the pressure information to the control system, and the control system adjusts a current of the magnetorheological damper coil 153 to cause an output resistance of the magnetorheological damper 15 to be zero; where in this case, only a crushing member 10 bears external impact pressure, and the crushing member 10 is crushed and deformed.

3) When the crushing member 10 deforms and descends, a top cover 1, a piston rod 4 and a spiral valve element 6 are driven to move downwards synchronously, where hydraulic oil below the spiral valve element 6 is pressed to flow through a spiral recess at a high flow rate, thereby consuming impact energy.

The crushing member, the magnetorheological damper and the hydraulic buffer portion work together in the whole impact process, and the crushing member mainly plays the role of supporting, recessing and energy absorbing, the magnetorheological damper mainly controls the output resistance to achieve that the impact-resistant device may quickly recess and absorb energy when impact occurs, the hydraulic buffer portion plays the role of peak value reduction and energy absorbing, and the pressure sensor may monitor and record pressure change in real time, and determine whether the impact process occurs and whether the apparatus needs to be replaced.

What is described above is merely specific embodiments of the present invention, but a protection scope of the present invention is not limited thereto. Any change or substitution that may be easily conceived by any technician familiar with the technical field within the technical scope disclosed by the present invention should be covered within the protection scope of the present invention.

What is claimed is:

1. A compound impact-resistant device, comprising an inner cylinder, a first pressure sensor and an outer cylinder, wherein the inner cylinder is connected to an inner bottom surface of the outer cylinder, and the first pressure sensor is placed in the outer cylinder and connected to a bottom of the inner cylinder;
    an inner cavity of the inner cylinder is sequentially connected to a magnetorheological damper, a spiral valve element, a floating piston and a spring from bottom to top; and an inner top surface of the outer cylinder is connected to a piston rod, a bottom end of the piston rod penetrates a top of the inner cylinder, the spring and the floating piston to be connected to the spiral valve element, and a portion below the spiral valve element is filled with hydraulic oil;
    wherein the outer cylinder comprises a top cover, a crushing member and a base which are connected in sequence from top to bottom, and an upper end and a lower end of the crushing member are inserted into recesses provided in the top cover and the base respectively; wherein the crushing member is in a hollowed structure, is provided with multi-layered staggered transverse openings and the crushing member is adapted for supporting, recessing and energy absorbing;
    wherein a surface of the spiral valve element is provided with a plurality of circles of spiral recesses.

2. The compound impact-resistant device according to claim 1, wherein an inner surface of the top cover is provided with a top cover welded member, and an upper end and a lower end of the piston rod are in threaded connection to the top cover welded member and the spiral valve element respectively.

3. The compound impact-resistant device according to claim 1, wherein the inner cylinder comprises an end cover, a cylinder body and a cylinder base which are sequentially connected from top to bottom, the end cover being connected to the cylinder body by means of a bolt, the cylinder body being welded on the cylinder base, and the cylinder base being placed on the base of the outer cylinder.

4. The compound impact-resistant device according to claim 3, wherein silicone seals are arranged between the floating piston and an inner wall of the cylinder body, between the piston rod and the end cover, and between the piston rod and the floating piston.

5. The compound impact-resistant device according to claim 3, wherein a lower half of the cylinder body is provided with a sensor interface, and the first pressure sensor is in threaded connection to the sensor interface.

6. The compound impact-resistant device according to claim 1, wherein the magnetorheological damper comprises a magnetorheological damper piston rod, a magnetorheological damper piston, a magnetorheological damper coil and a magnetorheological damper cylinder, wherein the magnetorheological damper piston is placed in the magnetorheological damper cylinder, the magnetorheological damper coil encircles the magnetorheological damper piston, and the magnetorheological damper piston rod extends into the magnetorheological damper cylinder to be connected to the magnetorheological damper piston.

7. The compound impact-resistant device according to claim 6, wherein the compound impact-resistant device further comprises a control system, an outer surface of the top cover is provided with a second pressure sensor, and the first pressure sensor, the second pressure sensor and the magnetorheological damper coil are connected to the control system respectively.

8. A working method of the compound impact-resistant device according to claim 7, comprising:
    1) mounting the impact-resistant device at a position needs to bear impact buffering, and connecting a first pressure sensor, a second pressure sensor and a magnetorheological damper coil to a control system, wherein in this case, a magnetorheological damper outputs a maximum resistance, and the whole impact-resistant device is in a maximum buffer resistance output state;
    2) collecting, when the impact-resistant device receives external impact pressure, pressure information and transmitting the pressure information to the control system by the second pressure sensor, and adjusting, by the control system, a current of the magnetorheological damper coil to cause an output resistance of the magnetorheological damper to be zero; wherein in this case, only a crushing member bears external impact pressure, and the crushing member is crushed and deformed; and
    3) driving, when the crushing member deforms and descends, a top cover, a piston rod and a spiral valve element to move downwards synchronously, wherein hydraulic oil below the spiral valve element is pressed to flow through a spiral recess, thereby consuming impact energy.

* * * * *